United States Patent
Erber

[11] Patent Number: 5,871,253
[45] Date of Patent: *Feb. 16, 1999

[54] LINING PART, PARTICULARLY A DOOR-LINING CARRIER FOR MOTOR VEHICLES

[75] Inventor: Arnold Erber, Cham, Germany

[73] Assignee: Kunststoffwerk Katzbach GmbH, Cham, Germany

[*] Notice: This patent issued on a continued prosecution application filed under 37 CFR 1.53(d), and is subject to the twenty year patent term provisions of 35 U.S.C. 154(a)(2).

[21] Appl. No.: 548,774

[22] Filed: Oct. 26, 1995

[30] Foreign Application Priority Data

Nov. 3, 1994 [DE] Germany ............ 44 39 221.4

[51] Int. Cl.⁶ ............................................ B60J 5/04
[52] U.S. Cl. ............................ 296/146.6; 296/146.7
[58] Field of Search ............... 296/39.1, 146.7, 296/146.6

[56] References Cited

U.S. PATENT DOCUMENTS

| | | | |
|---|---|---|---|
| 4,049,311 | 9/1977 | Dietrich et al. | 296/24.1 |
| 5,040,335 | 8/1991 | Grimes | 296/146.7 |
| 5,224,299 | 7/1993 | Abe | 296/39.1 |
| 5,306,066 | 4/1994 | Saathoff | 296/146.6 |
| 5,306,068 | 4/1994 | Nakae et al. | 296/146.6 |
| 5,308,112 | 5/1994 | Hill et al. | 280/730.2 |
| 5,340,151 | 8/1994 | Sato | 280/730.2 |
| 5,345,721 | 9/1994 | Stein et al. | 296/146.7 |

FOREIGN PATENT DOCUMENTS

| | | | |
|---|---|---|---|
| 404169346A | 6/1992 | Japan | 296/146.7 |
| 405345519A | 12/1993 | Japan | 296/146.6 |
| 406270674A | 9/1994 | Japan | 296/146.7 |

*Primary Examiner*—Gary C. Hoge
*Attorney, Agent, or Firm*—Jordan and Hamburg LLP

[57] ABSTRACT

A lining part, particularly a door-lining carrier for a motor vehicle, comprises a basic expandable polystyrene (EPS) or polyphenylene oxide (PPO) part, to which is foamed at least on one side a reinforcing layer, and energy-absorbing elements are embedded in the basic part.

5 Claims, 2 Drawing Sheets

5,871,253

LINING PART, PARTICULARLY A DOOR-LINING CARRIER FOR MOTOR VEHICLES

BACKGROUND OF THE INVENTION

The invention relates to a lining part, particularly to a door-lining carrier, for a motor vehicle, preferably of foamed plastic.

Such lining parts, especially the door-lining carriers addressed above, are manufactured in the automobile industry from various materials such as molded fiber-containing materials, flax/sisal bonded in resin, HM polypropylene, hard polyurethane foam with fiberglass or glass mats, as well as of thermoplastic materials. At the surface, these carriers have a decor on which the adhesive is placed or which is connected directly with the carrier.

The weight of all these lining parts is high and there is a lack of integrated protection zones in the event of an impact from the side. Aside from a lack of additional thermal insulation and sound protection, many of them absorb water up to an amount of 40% by weight. With the passage of time, this leads not only to a destruction of the lining part, but also to an appreciable increase in the total weight of the vehicle.

SUMMARY OF THE INVENTION

It is therefore an object of the invention to design a lining part, particularly a door-lining carrier of the initially-described type, in such a manner that it can be manufactured easily, can be adapted variously to the different requirements in the sundry regions of a vehicle and, aside from making high protection values possible in the event of a side impact, also have a high resistance and shows little evidence of aging.

Pursuant to the invention, this objective is accomplished owing to the fact that the lining part consists of a basic, expandable polystyrene (EPS) or polyphenylene oxide (PPO) part, to which is foamed a reinforcing layer on at least one side and in that energy-absorbing elements are embedded in the polystyrene or polyphenylene oxide.

In many cases, it is advantageous if said reinforcing layer, which may be, for example, a fiberglass mat, is foamed on both sides to the basic part. Due to the inventive construction, in conjunction with the embedded, energy-absorbing elements, lining parts result which, on the one hand, are very easily produced and, on the other, can be modified variously with regard to their function and their properties. For example, by molding chambers for accommodating things built in, it is also possible to build in a side air bag, so that, at the same time, in several respects, there is increased safety for the passengers of a vehicle.

Finally, it is also within the scope of the invention that the basic part has different thicknesses and/or different apparent densities in regions, so that the basic part can be constructed thicker in special crash zones and that these zones are connected with other regions through relatively elastic, thinner connecting pieces. As a result, material is saved and weight reduced at places at which neither is required because these places are not stressed under operating conditions or in the event of a crash. Moreover, it is also relatively easy to achieve different apparent densities when foaming in the mold, into which, of course, the reinforcing layers are placed previously. The energy-absorbing elements can either also be placed previously in the mold or inserted subsequently into appropriate cavities in the basic part in the event that fillers are used in the form of plastic foams the latter can also be produced directly in the mold in a 2-step method.

Further advantages, distinguishing features and details of the invention arise out of the following description of an Example, as well as from the accompanying drawings.

DESCRIPTION OF THE PREFERRED EMBODIMENTS

Figure 1:
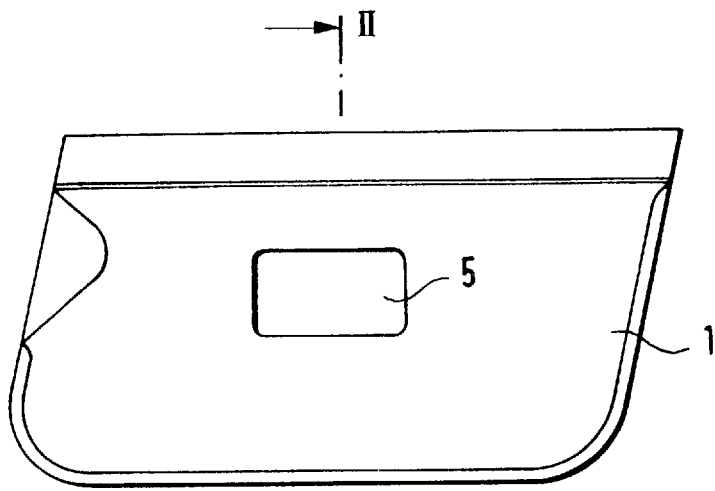
FIG. 1 shows a view of an inventive door-lining carrier.
Figure 2:
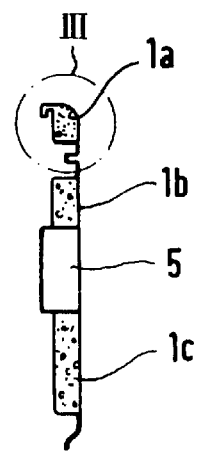
FIG. 2 shows a section along the line II—II of FIG. 1.
Figure 3:
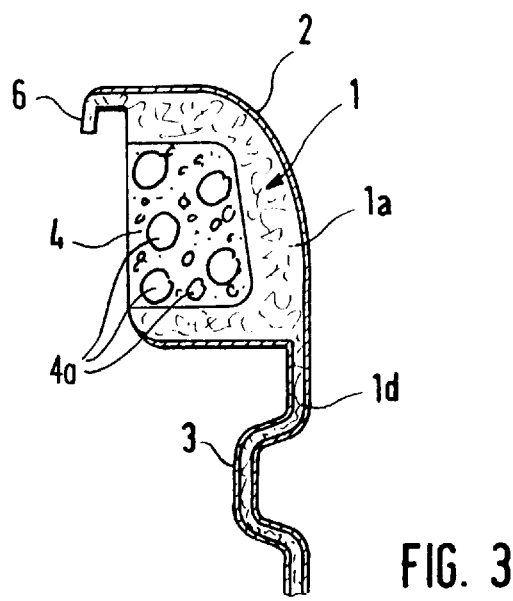
FIG. 3 shows an enlarged section through the upper region III of FIG. 2.
Figure 3A:
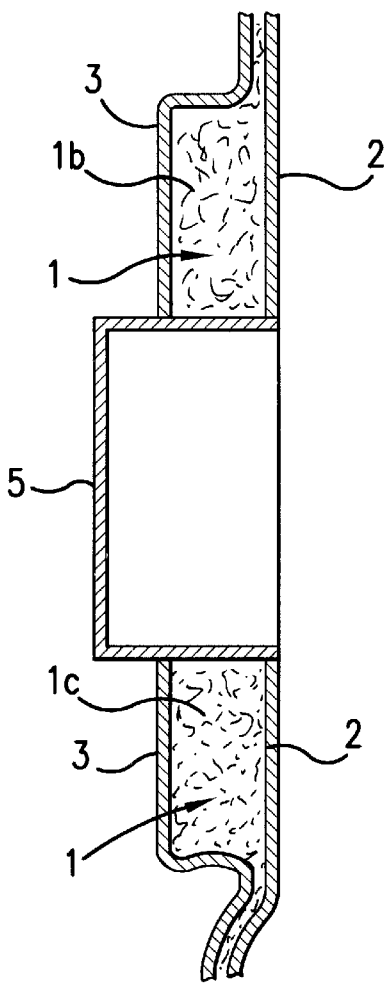
FIG. 3A shows an enlarged section through the lower region of FIG. 2.
Figure 4:
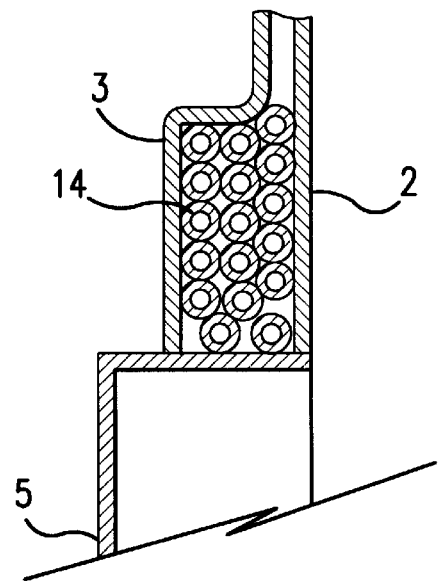
FIG. 4 shows a partial enlarged section similar to the upper part of FIG. 3A but depicting an alternate energy-absorbing element-embodiment.
Figure 5:
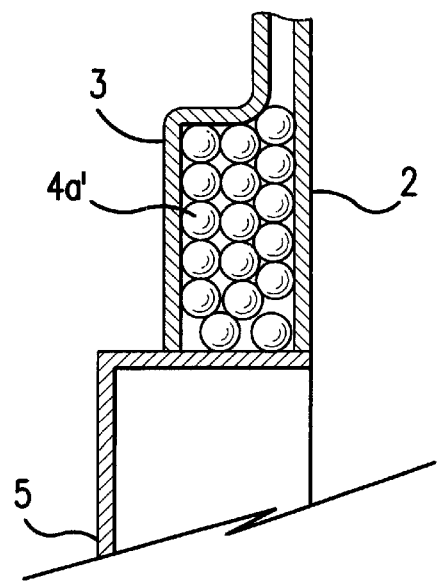
FIG. 5 shows a partial enlarged section similar to the upper part of FIG. 3A but depicting a further alternate energy-absorbing embodiment.

The door-lining carrier shown consists of a basic part 1, sections of which have very different thicknesses. Aside from sections 1a to 1c, which are particularly thick and serve to collect lateral forces, regions of lesser thickness connecting these are provided. The thinner connecting section 1d can be seen particularly in FIG. 3. A reinforcing layer 2 or 3, in the form of a fiberglass mat or the like, is foamed to this basic part. Embedded energy-absorbing elements, in the form of embedded fillers 4a, can be seen at 4. The elements can also be constructed as a collapsible metal pipes 14 shown in FIG. 4 as illustrated in FIG. 5. Advantageously, hollow balls 4a of glass or ceramic can also be used as energy-absorbing elements. As with other highly absorbing elements, the balls 4a can also be tied into a polyurethane foam in a separate manufacturing process. The number and size of the absorbers, as well as the shape, are determined by calculations and practical experiments supported by static-dynamic testing. The position of the energy-absorbing element depends on the special arrangement in the door-lining part and is provided at the place where, in the case of a side collision, particularly strong forces have to be absorbed, which otherwise could lead to extensive penetration of the door into the interior of the vehicle and to injury to the passengers.

At 5, a molded chamber for accommodating side air bags is shown, while a hook, which has been molded on for suspending the door-lining carrier in the metallic door of the vehicle, can be recognized at 6. In the example shown, the decorative layer, which is mounted on the door-lining carrier, is not demonstrated.

The invention is not limited to the example shown. For example, it would also be possible to use the inventive construction, for which the basic, expandable polystyrene or polyphenylene oxide parts are combined with foamed reinforcing layers on the one hand and embedded energy-absorbing elements on the other, for other parts of the motor vehicle, such as bumper bars, fenders or trunk linings.

In all of these cases, there are weight advantages over other materials. Moreover, the reinforcing materials can also exert an effect on the mechanical properties, such as the longitudinal extension and the compression strength.. Moreover, with respect to injury in the event of a collision from the side, the danger to the shoulder and pelvic regions is reduced through the use of high energy-absorbing elements. With respect to haptic and hardness of the foam, an inventive door-lining carrier can also be adjusted through different apparent densities and through the use of energy-absorbing elements in order to make it more comfortable. For the designer, there are stylistic refinements. Finally, an inventive lining part can be manufactured inexpensively and, moreover, also be utilized thermally without problems, since all the materials used can be recycled.

What I claim is:

1. A lining device for a motor vehicle in which the lining device enhances safety of the passengers in the motor vehicle upon impact and crashing of the motor vehicle, said lining device comprising:

a basic part made from one of expandable polystyrene and polyphenylene oxide;

said basic part having a least one side;

a reinforcing layer on said at least one side, said reinforcing layer including means for providing structural reinforcement to said basic part to which it applied; and energy-absorbing means comprising a plurality of discrete energy-absorbing elements embedded in said basic part absorbing applied forces upon impact and crashing of the motor vehicle to thereby enhance safety of the passengers in the motor vehicle.

2. A lining device for a motor vehicle, comprising:

a basic part made from expandable polystyrene or polyphenylene oxide;

said basic part having at least one side;

a reinforcing layer on said at least one side;

energy-absorbing means embedded in said basic part; and said energy-absorbing means comprising a plurality of balls.

3. A lining device for a motor vehicle, comprising:

a basic part made from expandable polystyrene or polyphenylene oxide;

said basic part having at least one side;

a reinforcing layer on said at least one side;

energy-absorbing means embedded in said basic part;

said energy-absorbing means comprising a plurality of balls; and said balls being hollow balls of glass or ceramic.

4. A liner for placement within a door on a motor vehicle in which the liner enhances safety of the passengers in the motor vehicle upon impact and crashing of the motor vehicle, said liner comprising:

a basic part made from one of expandable polystyrene and polyphenylene oxide;

said basic part having at least one side;

a reinforcing layer of fiberglass on said at least one side of said basic part;

energy-absorbing means embedded in said basic part absorbing laterally applied forces upon impact and crashing of the motor vehicle to thereby enhance safety of the passengers in the motor vehicle; and mounting means mounting said liner within said door of said motor vehicle.

5. The combination comprising a motor vehicle door and a liner for said motor vehicle door in which the liner enhances safety of the passengers in the motor vehicle upon impact and crashing of the motor vehicle, said liner comprising:

a basic part made from one of expandable polystyrene and polyphenylene oxide;

said basic part having at least one side;

a reinforcing layer of fiberglass on said at least one side of said basic part;

energy-absorbing means embedded in said basic part absorbing laterally applied forces upon impact and crashing of the motor vehicle to thereby enhance safety of the passengers in the motor vehicle and mounting means mounting said liner within said motor vehicle door.

* * * * *